Figure 1:
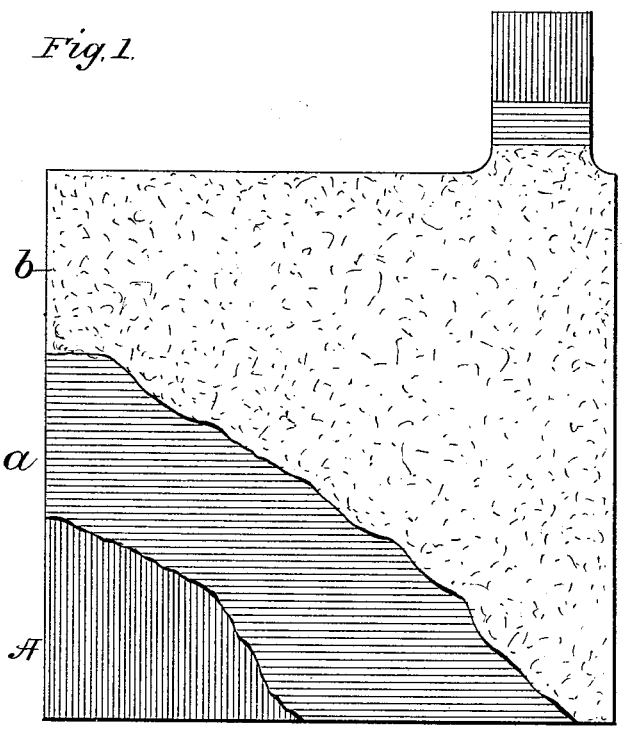

(No Model.)

L. DUNCAN.
SECONDARY BATTERY.

No. 394,471. Patented Dec. 11, 1888.

Witnesses:

Inventor:

UNITED STATES PATENT OFFICE.

LOUIS DUNCAN, OF BALTIMORE, MARYLAND.

SECONDARY BATTERY.

SPECIFICATION forming part of Letters Patent No. 394,471, dated December 11, 1888.

Application filed May 12, 1888. Serial No. 273,692. (No model.)

*To all whom it may concern:*

Be it known that I, LOUIS DUNCAN, of Baltimore, in the State of Maryland, have invented a certain new and useful Improvement in Secondary Batteries, of which the following is a specification.

My invention relates to the plates or electrodes of secondary batteries. Heretofore two kinds of plates have been used—viz., those consisting of a lead or lead-alloy base-plate or core on which peroxide of lead which forms the active material is electrolytically formed, and those in which the base-plate or core is made of lead or lead-alloy, and is provided with cells or recesses in which the active material is placed mechanically. Various difficulties and objections have arisen in the use of each of these forms. In the first-named form—the Planté form—the lead plate has to be thick and heavy, and the active material must therefore, in order to bear an effective ratio to the weight of the inert part of the plate, be thickly deposited. The process of producing this thick deposit is a slow and tedious one. In a cell of convenient size only a comparatively small number of these thick heavy plates can be placed, and the discharging-surface per pound of material is small. Another difficulty is the local action which is set up between the peroxide of lead and the lead plate, and also in the peroxide itself between the different layers of the thick deposit. Such local action is a cause of loss, and results also in the destruction and falling off of the active material, which makes the discharge from the surface of the plate uneven, and in the buckling of the plate which causes short-circuiting, and gradually the whole plate will be reduced to peroxide of lead and it will fall to pieces. In the other form of plate—the Faure plate—similar difficulties occur. The plate is heavy and bulky and complicated in structure, and the same local action occurs, resulting in the disintegration of the active material, so that it falls out of the retaining-cells.

It is the object of my invention to overcome these difficulties—that is, to decrease the weight and bulk of the plates, to enable the surface to be increased, to simplify and quicken the process of formation, to increase the ratio of the inactive to the active material of the plate, and to do away with local action and the ill effects consequent thereon.

To this end the main feature of my invention consists in providing the supporting and conducting base-plate or core with a protecting covering impervious to the electrolyte used in the battery, upon which covering the active material is applied. This protecting covering I prefer to consist of a hard dense deposit of an oxide of lead. I prefer to apply such covering in the following way: The supporting-plate or core, which is of any suitable material and form, I make the anode of an electrolytic bath containing an alkaline solution of a salt of lead, preferably a solution of litharge in caustic soda or potash. For the cathode of the bath I prefer to use a lead plate. I employ a very weak current, and preferably while the electrolysis is going on I keep up an agitation, either by mechanically shaking the bath or the plates, by stirring the liquid by means of a blast of air, by keeping up a circulation of the liquid, or by any other suitable and convenient method. The result of this is the formation on the anode of the cell of a deposited coating of an oxide of lead. This coating is of a black color, is very dense, hard, homogeneous, and even, adheres with great firmness to the plate, and is impervious to such solutions as are used in secondary batteries. It may be made as thin as desired. It adds stiffness to the plate, but is sufficiently flexible to bend with the plate, if necessary. Such a covering may be applied to plates of any form and material. External to such covering I place the active material, preferably peroxide of lead of a loose or porous formation, and I may form or apply this by any well-known or suitable process, either chemical or mechanical.

My invention is illustrated in the annexed drawings.

Figure 2:
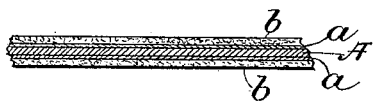

Figure 1 is a plan view of a plate embodying said invention, with portions of the different layers of material broken away to show those beneath; Fig. 2, a cross-section of a portion of the same; and Fig. 3 a cross-section of a cellular plate or grid, the active material being omitted for convenience of illustration.

In Figs. 1 and 2, A is a plate of lead or other suitable conducting material. $a\ a$ is the hard dense impervious coating of an oxide of lead on each side of the plate. $b\ b$ is the external active material.

Figure 3:
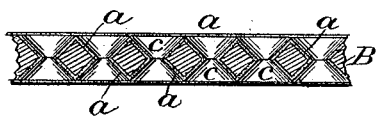

In Fig. 3 the base-plate B is one having cells or recesses $c$ formed in it on each side, and the deposited protecting coating $a\ a$ enters these depressions, so that the whole metal surface is evenly covered with the same. The active material is placed, as usual, in the cells $c$.

It will be seen that the impervious layer between the core and the active material shuts off the former from all electrolytic action when in use, so that the same is merely a support and a conductor and is not appreciably affected or changed in any way by the use of the battery. This being so, I am enabled to largely decrease the thickness and weight of such plate, and to make it, if desired, of metals other than lead and of greater strength or greater conductivity than lead. Furthermore, the layer of active material may be made much less thick than heretofore. It is evident that with a thin layer of active material the amount of local action within the active material itself will also be much decreased. I can, however, further make the active layer thick enough to bear a much greater ratio than heretofore to the inactive material or core, whereby the efficiency of the plate is evidently increased. It is also evident that with the thin plates a much greater surface and a greater charging and discharging capacity can be obtained in proportion to the weight, and a much greater number of plates can be assembled in a cell of convenient size. The durability of the plates is of course also much increased, the base-plate remaining unchanged and there being little or no effect on the active material.

The charge and discharge are more even throughout the surface, and therefore the battery can be charged and discharged more quickly.

I do not claim herein the process above described of forming the protecting coating, since this is claimed in my application, Serial No. 273,693, of even date herewith.

What I claim is—

1. In a secondary-battery plate, the combination, with the core or supporting-plate and the active material, of a layer of material between them, whereby local action is prevented, substantially as set forth.

2. In a secondary-battery plate, the combination of the core or supporting-plate, an impervious covering therefor, and active material external to said covering, substantially as set forth.

3. In a secondary-battery plate, the combination of the core or supporting-plate, a deposited impervious coating thereon, and active material external to said coating, substantially as set forth.

4. In a secondary-battery plate, the combination of the core or supporting-plate and the active material of a hard and dense layer between them of an oxide of lead, substantially as set forth.

5. In a secondary-battery plate, the combination of the core or supporting-plate, a hard and dense deposited coating thereon of an oxide of lead, and active material external to said coating, substantially as set forth.

6. In a secondary-battery plate, the combination of the core or supporting-plate, a hard dense layer of an oxide of lead, and an external layer of loose or porous peroxide of lead, substantially as set forth.

7. In a secondary-battery plate, the combination, with the core or supporting-plate, of inner and outer layers, both of the same material, the inner layer being dense and impervious to the electrolyte and the outer one pervious to the electrolyte, substantially as set forth.

8. A core or supporting-plate for a secondary-battery element provided with an impervious protecting covering, substantially as set forth.

9. A core or supporting-plate for a secondary-battery element provided with an impervious coating of an oxide of lead, substantially as set forth.

10. A lead or lead-alloy core or supporting-plate for a secondary-battery element provided with an impervious protecting covering, substantially as set forth.

11. A lead or lead-alloy core or supporting-plate for a secondary-battery element provided with an impervious coating of an oxide of lead, substantially as set forth.

12. In a secondary-battery plate, the combination of a lead or lead-alloy core or supporting-plate, a hard dense coating thereon of an oxide of lead, and an external layer of loose or porous peroxide of lead, substantially as set forth.

This specification signed and witnessed this 9th day of May, 1888.

LOUIS DUNCAN.

Witnesses:
W. SCOTT GOSWELL,
P. H. C. STITCHER, Jr.